United States Patent Office 2,730,168
Patented Jan. 10, 1956

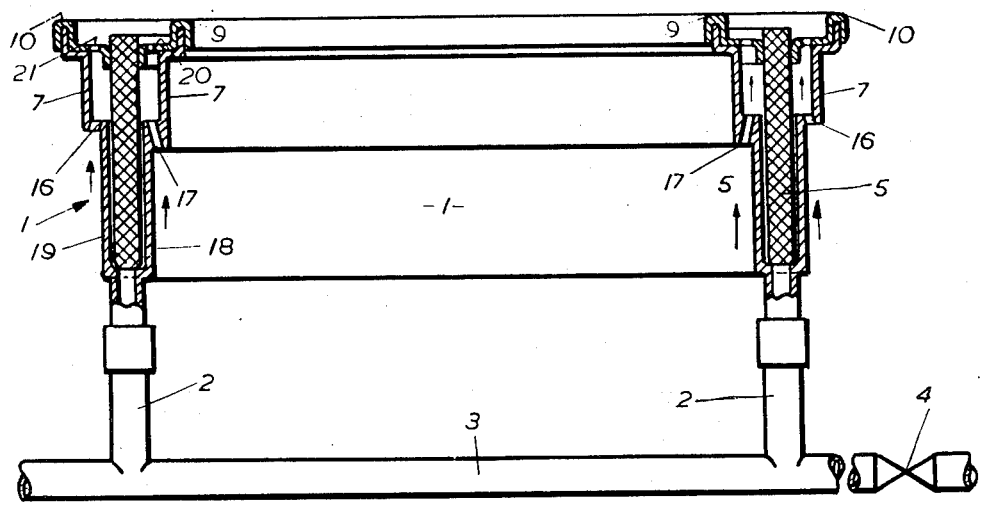
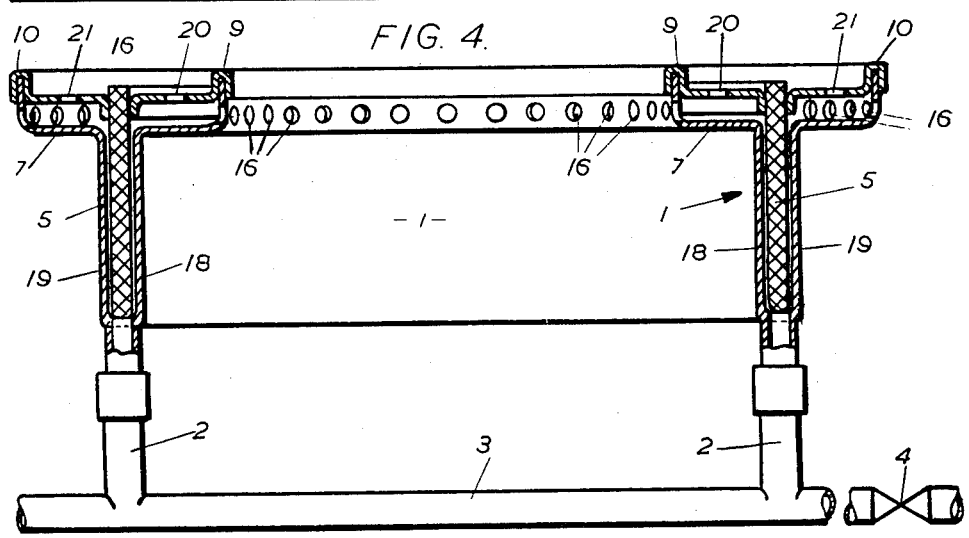

---

2,730,168

LIQUID FUEL BURNERS

Alfred Eric Thorpe, Sutton Coldfield, England

Application August 5, 1949, Serial No. 108,695

2 Claims. (Cl. 158—88)

This invention has reference to a liquid fuel burner of the kind consisting of an annular trough or bowl for containing a weak or kindler, controllable means for supplying the annular trough with liquid fuel from a supply source and a support at the upper end of the bowl upon which a heat utilization device is adapted to rest.

When such burners are in use it is found that uncontrolled combustion takes place in the fuel vaporising zone due to high temperature obtaining in the burner bowl and kindler and as a result the kindler becomes unduly carbonised and a carbon deposit forms on the wall of the bowl, this carbonisation and/or deposit not only reducing the efficiency of the burner but calling for frequent servicing of the burner and replacement of kindler at an earlier period in its life than should be necessary.

The main object of the present invention is to provide a liquid fuel burner of the kind referred to in which these disadvantages are removed or minimised.

Generally, a burner in accordance with the invention comprises an annular fuel trough having spaced concentric cylindrical inner and outer walls. These walls are relatively thin and are formed of thermally conductive material such as metal. The inner and outer walls are divergently flared away from each other at their upper end portions. An outer ring member is supported at the flared upper end of the outer wall and the inner ring member is supported at the flared upper end of the inner wall. The outer ring member has an inwardly extending flange portion with a circular central opening which is concentric with the trough. The inner ring member comprises an outwardly extending flange portion which has a circular external periphery concentric with the trough and spaced from the central opening of the outer ring member to define an annular opening therebetween which communicates the space between the flared upper ends of the trough walls.

The cylindrical wick or kindler extends upwardly from the lower portion of the fuel trough through the annular opening between the inner and outer ring members. The lower portion of the kindler which is immersed in fuel in the trough is in heat transferring proximity to the portions of the walls of the trough below the flared portions so that it will be cooled by air flowing over the lower portions of the trough walls.

Vent means are provided in the flared portions of the trough walls and in the ring members so that relatively cool combustion air will be drawn upwardly over the trough walls and through the cup-shaped space between the flared upper portions of the trough walls where the upwardly moving air comes directly into contact with the upper portion of the wick immediately below the ring members. This upwardly moving cool combustion air cools the wick and reduces the tendency toward the formation of any objectionable carbon deposits such as those referred to above.

Various embodiments of liquid fuel burners according to the present invention are illustrated by way of example on the accompanying drawings, wherein:

Fig. 3 is a vertical sectional elevation of the first modification of the burner.

Fig. 4 is a vertical sectional elevation of the second modification of the burner.

Figure 1:
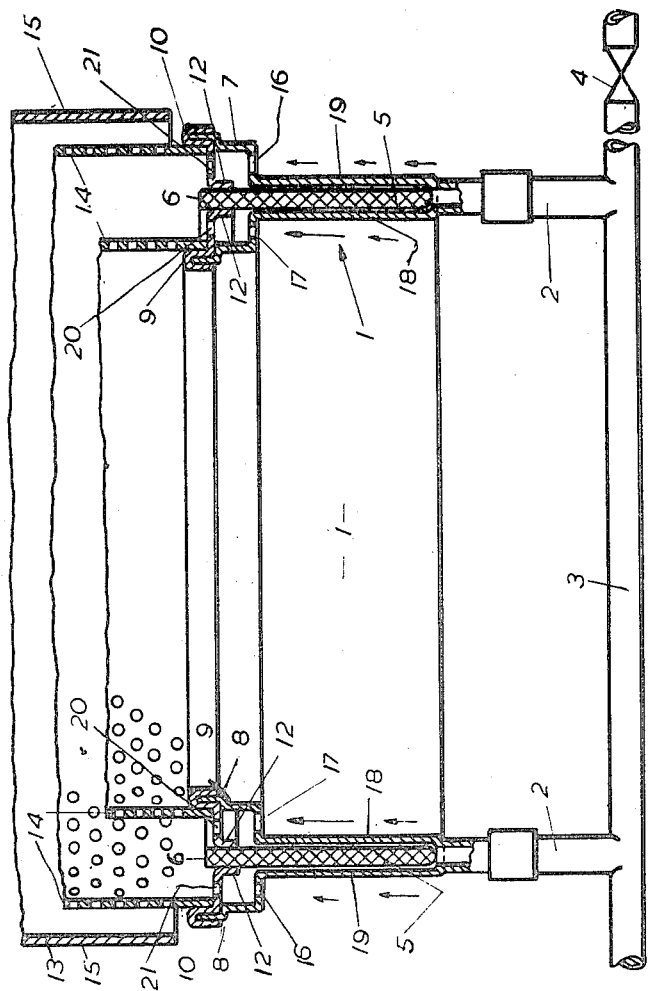
Fig. 1 is a vertical sectional elevation of a liquid fuel burner surmounted by a detachable generator which latter forms no part of the present invention.
Figure 2:
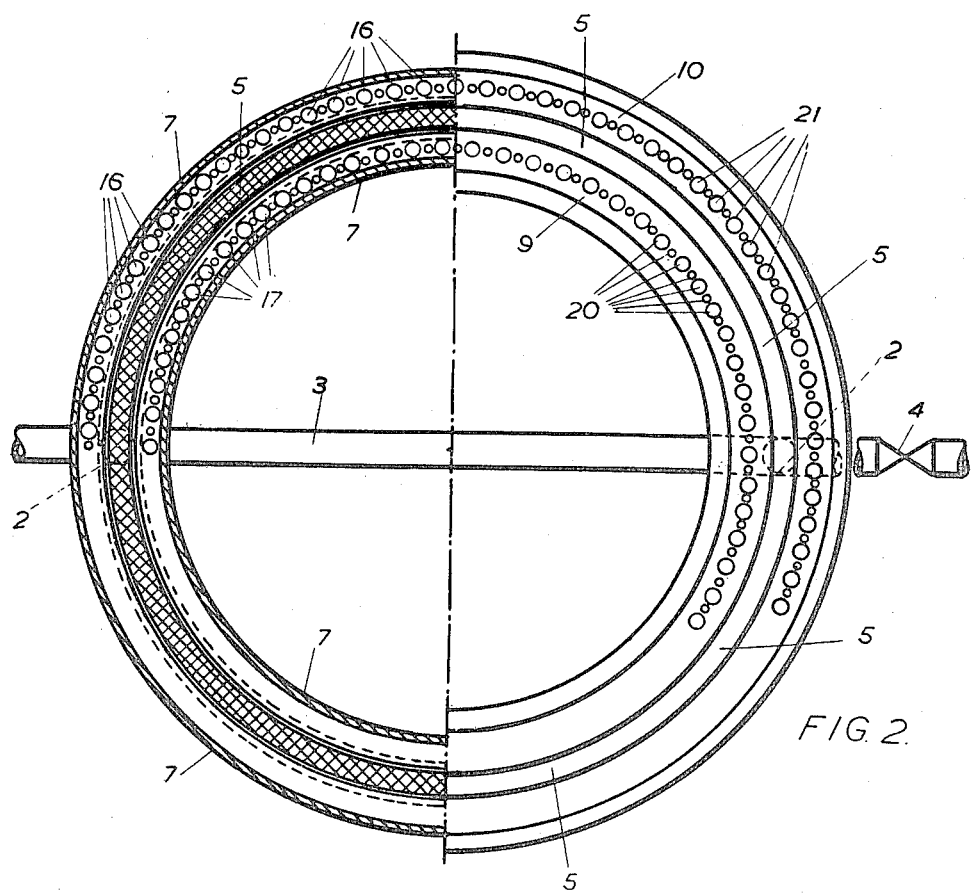
Fig. 2 is a sectional plan of Fig. 1 (the generator being omitted), taken on the dotted line A—A.

Referring to Figs. 1 and 2, a liquid fuel burner consists of an annular trough or bowl 1 having spaced upwardly extending inner and outer walls, the trough 1 being connected at its base to vertical branches 2 of a liquid fuel supply pipe 3 normally communicating with a storage tank, the supply of fuel to the pipe 3 being controlled by a suitable valve indicated at 4.

A cylindrical wick or kindler 5 is disposed with its lower end immersed in the fuel supplied to the trough 1 through pipe 2 and with its upper end 6 arranged in a combustion chamber to be ignited for thermal utilization of the fuel. The upper end portions of the spaced concentric inner and outer walls 18 and 19 of the fuel trough 1 are flared outwardly away from each other by means of offset jog portions to define an annular cup shaped space 7 therebetween. At the upper ends 8 of the inner and outer walls 18 and 19 of fuel trough 1 there are supported an inner ring member 9 and an outer ring member 10, respectively. There is an annular space between a central aperture in the outer ring member 10 and the external periphery of the inner ring member 9 and the kindler 5 extends through this annular space. The ring members 9 and 10 are formed with downwardly turned lip portions 12 which embracingly engage the inner and outer sides of the kindler 5, supporting the kindler 5 with its upper end 6 protruding above the ring members 9 and 10.

The relatively thin walls 18 and 19 of the trough 1 are preferably formed of metal or similar thermally conductive material and the lower end of the kindler 5 is shown disposed closely adjacent to the trough walls 18, 19 below the flared portions thereof so that it is in thermally conductive proximity thereto. If desired, the rings 9, 10, may be brazed in position or be readily detachable.

The ring members 9, 10, form a support for the base of a heat utilization device 13 which includes inter alia, spaced perforated concentric tubes 14 defining a combustion chamber therebetween and an outer imperforate tube 15.

According to Figs. 1 and 2, the base of the cup 7 is formed with two rings of perforations 16, 17, and they operate jointly vent means for inducing combustion air to circulate over the inner and outer walls 18, 19, of the trough 1, thence into the cup 7 and out through additional cooperating vent means formed by two groups of perforations 20, 21, in the rings 9, 10, as indicated by the arrows. This air circulation performs two functions, it dissipates heat from the walls 18, 19, of the trough 1 and the kindler 5 and supplies warm primary air to the vaporising space above the rings 9, 10, and as a result reduces the tendency as in earlier devices toward the formation of encrusted carbon on the kindler and, consequently, the deposit of carbon in the trough.

Referring to Fig. 3, the cup 7 is deeper relatively to Fig. 1 and the rings of perforations 16, 17, are offset relatively to the axis of the trough 1.

In connection with Fig. 4, the cup 7 is wide and shallow comparable to Figs. 1 and 3 and a ring of perforations 16 is formed in the outer wall of the cup 7 and near the bottom thereof.

If desired, another series of holes may be formed in the inner wall of the cup 7.

The number of holes in the cup 7 and in the rings 9, 10, may be chosen and the size may vary according to experiment.

It is, therefore, possible to vary the constructions of the burners described without departing from the scope of the invention defined by the claims.

What I claim is:

1. A burner for liquid fuels, comprising: an annular fuel trough having spaced concentric inner and outer walls formed of thermally conductive material, said walls being divergently flared at their upper end portions; an outer ring member comprising an inwardly extending flange portion having a circular central opening therein concentric with said trough, said outer ring member being supported by said outer wall at the upper end thereof; an inner ring member comprising an outwardly extending flange portion having a circular periphery concentric with said trough and spaced from said central opening in said outer ring member to define an annular opening therebetween communicating with space between said flared upper end portions of said walls, said inner ring member being supported by said inner wall member at the upper end thereof with its flange portion generally in the same plane as the flange portion of said outer ring member; a cylindrical kindler disposed in said trough in heat transferring proximity to the portions of said walls below said flared portions, said kindler extending upwardly through said annular opening and in contact with the edges of said ring members adjacent to said opening; vent means in said flared portions of said walls and further vent means in said ring members, said vent means communicating with space between said flared portions of said walls and around the upper portion of said kindler.

2. A burner according to claim 1, wherein the edges of said ring members adjacent to said annular opening are formed with downwardly turned lip portions which engage said kindler.

References Cited in the file of this patent

UNITED STATES PATENTS

| | | |
|---|---|---|
| 1,285,936 | Chadwick | Nov. 26, 1918 |
| 1,957,014 | Humpoletz | May 1, 1934 |
| 2,033,714 | Humpoletz | Mar. 10, 1936 |
| 2,197,866 | Kahn | Apr. 23, 1940 |
| 2,468,450 | Koszewski | Apr. 26, 1949 |